UNITED STATES PATENT OFFICE.

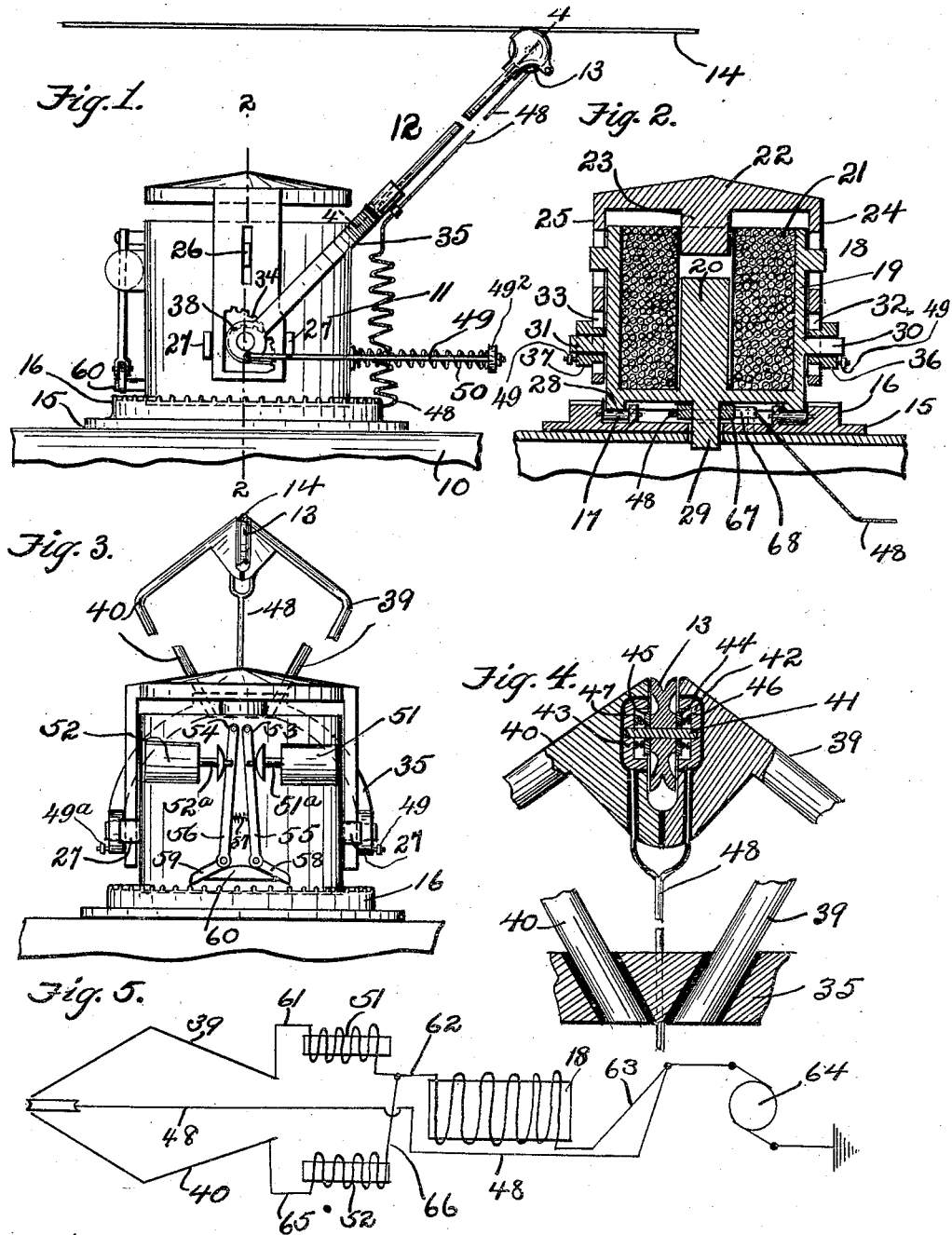

HOWARD H. PARKER, OF CLEVELAND, OHIO.

SELF-RESTORING TROLLEY.

940,718.  Specification of Letters Patent.  Patented Nov. 23, 1909.

Application filed November 23, 1908. Serial No. 464,171.

*To all whom it may concern:*

Be it known that I, HOWARD H. PARKER, a citizen of the United States of America, residing at Cleveland, in the county of Cuyahoga and State of Ohio, have invented certain new and useful Improvements in Self-Restoring Trolleys; and I hereby declare the following to be a full, clear, and exact description of the invention, such as will enable others skilled in the art to which it pertains to make and use the same.

This invention relates to a self-restoring trolley, and has for its object the provision of mechanism which will automatically restore the trolley wheel to the trolley wire immediately after the wheel has jumped the latter.

In carrying out my invention I provide mechanism which is normally inactive but is brought into operation as soon as the trolley wheel leaves the trolley wire to cause the trolley pole and the trolley wheel to be shifted downward and laterally until the wheel again engages the trolley wire.

In the preferred embodiment of my invention I employ motive devices in the form of magnets, preferably of the solenoid type, for shifting the pole vertically and laterally and in connection with these magnets employ a specially constructed trolley pole having a pair of contact arms which are so arranged that one of the latter will engage the trolley wire when the trolley wheel leaves the wire and the pole swings upward, and which are connected to the magnets and cause the latter to be energized when the contact between one of these arms and the trolley wire takes place. To shift the pole vertically I employ a single magnet, and to shift the pole laterally to bring the trolley wheel in alinement with the trolley wire, I employ two magnets each coöperating with one of the contact arms of the trolley pole, one of these magnets serving to shift the pole laterally in one direction, and the other magnet serving to shift the pole in the opposite direction, the particular magnet which is energized and consequently the direction in which the pole is shifted depending upon which side of the trolley wire the trolley pole swings upward when the trolley wheel leaves the wire.

My invention may be further briefly summarized as consisting in certain novel details of construction and combinations and arrangements of parts which will be described in the specification and set forth in the appended claims.

For a better understanding of my invention, reference is had to the accompanying drawings, in which—

Figure 1 is a side elevation of a portion of the top of the car equipped with one of my self-restoring trolleys, parts being broken away. Fig. 2 is a vertical sectional view along the line 2—2, Fig. 1, looking in the direction indicated by the arrow, the section being taken through the trolley base and through the magnet which when energized lowers the trolley pole. Fig. 3 is an end view of the trolley and of the operating mechanism looking toward the rear of the car. Fig. 4 is an enlarged sectional view along the line 4—4, Fig. 1, portions being omitted. Fig. 5 is a diagrammatic representation of the electric circuits showing the relation of the magnets and contact devices to the trolley and the motor of the car.

In carrying out my invention any preferred form and construction of parts may be employed as long as they meet the necessary requirements, but in the drawings I have shown one embodiment which answers the requirements very effectively, and in said embodiment 10 represents a portion of the top of the trolley car, 11 represents as a whole the trolley base, 12 the trolley pole, 13 the trolley wheel, and 14 the trolley wire. On the top of the car is a base plate 15 provided with a circular rack 16, and within said rack, with a circular series of roller bearings 17 and with a centrally located opening. The trolley base 11 consists chiefly of a motive device in the form of a solenoid magnet 18 of the iron clad type, said magnet having an outer cylindrical casing 19, an inner stationary core 20, a magnet coil 21 located in the annular space between the outer casing 19 and the core 20, and an armature 22 in the form of a cap or head having a downwardly projecting lug 23 which extends into the coil toward the core 20 and on diametrically opposite sides with a pair of parallel straps or arms 24 and 25 which extend downward on the outer side of the casing 19 and are guided in their movements by lugs 26 which engage elongated slots in the arms and lugs 27 which engage the edges of the arm. This casing is swiveled on the base plate and for this purpose is provided at its lower end with a circular flange 28 which engages the circular series of roller bearings 17 and is provided also with a depending stud, or projection 29 which extends through the centrally located opening in the base plate. The casing is also provided on opposite sides with outwardly extending studs or trunnions 30 and 31 on which the trolley pole 12 is pivotally mounted so that it can swing vertically and which extend through the openings or cut away portions 32 and 33 in the depending parallel arms 24 and 25 on the armature of the magnet. One side of the opening of each of the arms 24 and 25 is provided with rack teeth 34 shown in Fig. 1.

The trolley pole 12 is provided with a forked portion 35, the arms of which extend on opposite sides of the sides of the magnet casing and are provided at their ends with hubs 36 and 37 which loosely engage the studs or trunnions 30 and 31, each of the hubs having a toothed portion 38, shown in Fig. 1, which engages the corresponding depending arm of the armature. As will be explained later, the teeth on the arms and hubs respectively are not of the usual construction, but the teeth on the hub are arranged at successively increasing distances, so that, as the trolley pole is swung downward and as the magnet armature approaches the magnet coil, the leverage exerted by the teeth on the arms of the armature upon the teeth of the hubs of the trolley pole will gradually become less.

Secured to the fork at the center thereof are two outwardly bowed arms 39 and 40 which, as is shown in Fig. 4, are insulated from the fork and from each other at their inner ends. The outer or free ends of the arms are adjacent each other and as shown in the drawings, are enlarged. These enlarged outer ends of the arms support the trolley wheel 13, and are insulated from the latter and from each other, so that the two arms are nowhere in electrical engagement or contact with each other. The trolley wheel may be supported in any desired manner, but in the present case is mounted on a stud or pin 41, the ends of which are mounted in plates 42 and 43 carried by the adjacent outer ends of the two arms respectively and are carefully insulated from the latter. The current is transmitted to these plates 42 and 43 by means of the stud 41 and also by means of contact plates or brushes 44 and 45 which engage opposite sides of the trolley wheel hub and by means of springs 46 and 47 which are interposed between the plates or brushes 44 and 45 and the plates 42 and 43. The current is conducted from the plates 42 and 43 by means of a conductor 48 shown in Figs. 1, 3, and 5, said conductor being connected, in the usual manner, to the electric propelling motor or motors. The trolley wheel is held yieldingly against the trolley wire by means of rods 49 and 49ª which are pivotally connected to the respective hubs 36 and 37 on the trolley pole. A cross piece 49² connects the outer ends of said rods and between said cross piece 49² and the casing 19 is interposed a spring 50.

On the forward side of the trolley base or of the casing 19 of the magnet above described are two magnets 51 and 52 in the form of solenoids having inwardly extending armatures 51ª and 52ª. It may be here stated that the purpose of one of these magnets is to turn the trolley base and swing the pole laterally in one direction and the purpose of the other magnet is to turn the trolley base and to swing the trolley pole laterally in the opposite direction. Pivoted upon the magnet casing 19, at 53 and 54 respectively, intermediate the two magnets 51 and 52 are two levers 55 and 56 connected respectively to the armatures 51ª and 52ª of the two magnets 51 and 52 and connected together by a coil spring 57. The lower ends of these levers are provided respectively with pawls 58 and 59 which when the magnets 51 and 52 are deënergized normally rest upon a ledge or shoulder 60 projecting outwardly from the casing 19, with the ends of the pawls out of engagement with and slightly above the teeth of the circular rack 16 on the base plate 15. It will be seen from the construction so far described that if the magnet 51 is energized the lever 55 will be drawn toward the magnet causing the pawl 58 to drop downward into engagement with one of the teeth of the circular rack 16, and as the latter is stationary further movement of the armature 51ª of the magnet 51 will cause the trolley base to be swung in a clockwise direction and the trolley pole to be swung to the right when viewed as in Fig. 3. When the magnet 51 is deënergized the spring 57 will cause the lever to be drawn to its normal position, shown in Fig. 1. In a similar manner if the magnet 52 is energized, the lever 56 and pawl 59 will cause the trolley base to be swung in a counter clockwise direction and the trolley pole and trolley wheel to be shifted laterally toward the left when viewed as in Fig. 3.

By referring now to the diagram of electrical connections shown in Fig. 5 it will be seen that the arm 39 of the trolley pole is connected by conductor 61 to the coil of the magnet 51 which is connected by conductor 62 to the coil of the magnet 18 which in turn is connected by conductor 63 to the driving motor 64 of the car. It will also be seen that the arm 40 of the trolley is connected by conductor 65 to the coil of the magnet 52 which in turn is connected by conductor 66 to conductor 62 and to the coil of the magnet 18. If desired the lower terminal of the coil 21 of the magnet 18 may be connected to a ring 67 (in Fig. 2) of good conducting material secured to the lower swivel stud 29 of the magnet casing, and this ring, if employed, will be engaged by a stationary brush 68 to which one of the conductors connected to the magnet may be attached, so as to convey the current to or from the coil 21.

By referring to Fig. 5 it will be seen that since the arms 39 and 40 are insulated from each other and from all parts of the electric circuit, when the trolley wheel is in engagement with the trolley wire, the magnets 18, 51 and 52 will be deënergized. If, however, the trolley wheel jumps the trolley wire either the arm 39 or the arm 40 will engage the latter on account of the bowed shape of the arms, the particular arm which engages the wire depending upon which side of the trolley wire the trolley wheel swings upward. If the arm 39 engages the trolley wire as the pole swings upward the circuit will be immediately completed through the magnets 18 and 51.

As soon as the magnets are energized by the engagement of the arm 39 and trolley wire, the armature 22 will be drawn downward, and on account of the downward movement of the arms 24 and 25 and the coöperating teeth of the lower ends of these arms the trolley pole will be swung downward. At the same time armature 51ª of the magnet 51 will be drawn shifting the lever 55 and causing the pawl 58 to engage one of the teeth of the rack 16 and this engagement of the pawl will cause the trolley base to be turned in a clockwise direction, and the pole to be swung laterally toward the trolley wire, this latter movement taking place at the same time that the pole is lowered. The pole will thus be shifted downward and laterally until the trolley wire again engages the trolley wheel, at which time the arm 39 leaves the trolley wire, and the circuit through the magnets 18 and 51 is broken. In a similar manner if the trolley pole swings upward on the opposite side of the trolley wire the magnets 18 and 52 will be energized and by the combined movements given to the trolley pole, the trolley will be immediately restored to the trolley wire.

The particular shape of the teeth on the lower ends of the arms 24 and 25 and on the hubs of the trolley fork is provided so as to neutralize the effect of the increased pull of the magnet 18 upon its armature during the final movement of the latter, or as it approaches the coil. By the provision of the teeth as shown the movement of the armature will be uniform for the entire distance through which it travels and the latter part of the downward movement of the trolley as it is about to engage the trolley wire will therefore be slow or gradual.

I do not desire to be confined to the exact details shown, but aim in my claims to cover all modifications which do not involve a departure from the spirit and scope of my invention.

What I claim is,—

1. In combination with a trolley pole and trolley wheel, means operative by the jumping of the trolley wheel from a trolley wire for shifting the pole downward and other means operative by the jumping of the trolley wheel from a trolley wire for shifting the pole laterally until the trolley wheel again engages the wire.

2. In combination with a trolley pole and trolley wheel, motive devices operative by the jumping of the trolley wheel from a trolley wire for shifting the pole downwardly and laterally until the wheel is restored to the wire.

3. In combination with a trolley pole and trolley wheel, electro-magnetic motive devices operatively connected to said trolley pole and serving to shift said pole downward and laterally when the trolley wheel jumps a trolley wire.

4. In combination with a trolley pole and wheel, a plurality of electro-magnetic motive devices operatively connected to said pole, and means on said pole and serving to complete the circuit through two of said motive devices when engaged by the trolley wire, said motive devices serving to shift the pole downwardly and laterally.

5. In combination a trolley wheel, trolley pole having two insulated contact arms adapted to engage the trolley wire when the wheel jumps the wire, a motive device for lowering the pole, a pair of motive devices one for shifting the pole laterally in one direction, and the other for shifting the pole laterally in the opposite direction, one of said last named motive devices being connected to each of said contact arms of the trolley pole.

6. In combination, a trolley pole and wheel, a trolley base on which said pole is pivoted, said base having a magnet operatively connected to the pole so as to lower the same when energized, a pair of magnets operatively connected to the trolley base, one serving when energized to turn the base in one direction and the other serving when energized to turn the base in the opposite direction, said pole having outwardly projecting insulated arms adapted to be engaged by the trolley wire when the trolley wheel leaves the same, each of said arms being connected to one of said last named magnets.

7. In combination with a trolley pole and trolley wheel, a magnet, an armature operatively connected with the trolley pole and arranged in proximity to said magnet and means for energizing said magnet when the trolley wheel leaves the trolley wire causing the armature to be attracted to the magnet and thereby shift the trolley pole.

8. In combination with a trolley pole and trolley wheel, of a base rotatably mounted on the car, magnets mounted on said base, armatures arranged in proximity to said magnets and operatively connected with said trolley pole and means for energizing said magnets when the trolley wheel leaves the trolley wire.

In testimony whereof, I sign the foregoing specification, in the presence of two witnesses.

HOWARD H. PARKER.

Witnesses:
VICTOR C. LYNCH,
GEO. S. VEDDER.